United States Patent
Saito et al.

(10) Patent No.: US 10,365,429 B2
(45) Date of Patent: Jul. 30, 2019

(54) MULTICORE FIBER AND OPTICAL CABLE

(71) Applicants: FUJIKURA LTD., Tokyo (JP); NATIONAL UNIVERSITY CORPORATION HOKKAIDO UNIVERSITY, Hokkaido (JP)

(72) Inventors: Shota Saito, Sakura (JP); Katsuhiro Takenaga, Sakura (JP); Kunimasa Saitoh, Hokkaido (JP); Takeshi Fujisawa, Hokkaido (JP)

(73) Assignees: FUJIKURA LTD., Tokyo (JP); NATIONAL UNIVERSITY CORPORATION HOKKAIDO UNIVERSTIY, Hokkaido (JP)

( * ) Notice: Subject to any disclaimer, the term of this patent is extended or adjusted under 35 U.S.C. 154(b) by 0 days.

(21) Appl. No.: 15/753,510

(22) PCT Filed: Jul. 6, 2016

(86) PCT No.: PCT/JP2016/070011
§ 371 (c)(1),
(2) Date: Feb. 19, 2018

(87) PCT Pub. No.: WO2017/033584
PCT Pub. Date: Mar. 2, 2017

(65) Prior Publication Data
US 2018/0246275 A1 Aug. 30, 2018

(30) Foreign Application Priority Data
Aug. 21, 2015 (JP) .................. 2015-163985

(51) Int. Cl.
G02B 6/02 (2006.01)
G02B 6/032 (2006.01)
G02B 6/44 (2006.01)

(52) U.S. Cl.
CPC .......... *G02B 6/02042* (2013.01); *G02B 6/02* (2013.01); *G02B 6/02342* (2013.01);
(Continued)

(58) Field of Classification Search
None
See application file for complete search history.

(56) References Cited

U.S. PATENT DOCUMENTS

2011/0188855 A1  8/2011  Kokubun et al.
2011/0206330 A1  8/2011  Sasaoka
(Continued)

FOREIGN PATENT DOCUMENTS

JP  2011-150133 A  8/2011
JP  2012-181282 A  9/2012
(Continued)

OTHER PUBLICATIONS

Cen Xia et al., "Supermodes for optical transmission", Optics Express, vol. 19, No. 17, pp. 16653-16664, Aug. 15, 2011 (12 pages).
(Continued)

*Primary Examiner* — Michelle R Connelly
(74) *Attorney, Agent, or Firm* — Osha Liang LLP

(57) ABSTRACT

A multicore fiber that includes: three or more cores that transmit in single-mode transmission; a common clad that covers a periphery of the three or more cores; and a low-refractive index portion that has a refractive index lower than a refractive index of the clad. The multicore fiber further includes a region having the three or more cores arranged annularly on a cross-section perpendicular to a longitudinal direction. At least a portion of the low-refractive index portion is arranged inside a minimum inscribed circle of two adjacent cores within the region.

11 Claims, 3 Drawing Sheets

(52) U.S. Cl.
CPC ............... *G02B 6/032* (2013.01); *G02B 6/44* (2013.01); *G02B 6/4401* (2013.01)

(56) References Cited

U.S. PATENT DOCUMENTS

| | | | |
|---|---|---|---|
| 2013/0016949 A1* | 1/2013 | Yao | G02B 6/02042 385/126 |
| 2013/0044988 A1 | 2/2013 | Tanigawa et al. | |
| 2013/0044989 A1 | 2/2013 | Tanigawa et al. | |
| 2013/0156393 A1* | 6/2013 | Kokubun | G02B 6/02042 385/126 |
| 2013/0301998 A1 | 11/2013 | Hayashi | |
| 2015/0316714 A1* | 11/2015 | Tsuchida | H01S 3/06737 385/127 |
| 2016/0320556 A1* | 11/2016 | Nasilowski | G02B 6/02042 |

FOREIGN PATENT DOCUMENTS

| | | |
|---|---|---|
| JP | 2012-203035 A | 10/2012 |
| JP | 5117636 B1 | 1/2013 |
| JP | 2013-040078 A | 2/2013 |
| JP | 2013-041148 A | 2/2013 |
| JP | 2013-090227 A | 5/2013 |
| JP | 2016-151716 A | 8/2016 |
| WO | 2010/038861 A1 | 4/2010 |
| WO | 2013/161825 A1 | 10/2013 |

OTHER PUBLICATIONS

R. Ryf et al., "Impulse Response Analysis of Coupled-Core 3-Core Fibers", ECOC Technical Digest 2012, Mo.1.F.4, 2012 (3 pages).

R. Ryf et al., "1705-km Transmission over Coupled-Core Fibre Supporting 6 Spatial Modes", ECOC 2014, PD.3.2, Cannes, France, 2014 (3 pages).

Akira Igari et al., "An analysis of transmission characteristics of homogeneously coupled-three-core fiber based on full-vector finite-element method and coupled field theory", IEICE Technical Report vol. 114, No. 453, OPE2014-224, Feb. 12, 2015 (8 pages).

K. Saitoh and M. Koshiba, "Full-vectorial imaginary-distance beam propagation method based on a finite element scheme: application to photonic crystal fibers", IEEE Journal of Quantum Electronics, vol. 38, No. 7, pp. 927-933, Jul. 2002 (7 pages).

Okamoto, "Fundamentals of Optical Waveguides", Corona, 1992 (1 page).

* cited by examiner

1st

6th

MULTICORE FIBER AND OPTICAL CABLE

TECHNICAL FIELD

The present invention relates to a multicore fiber and an optical cable using the multicore fiber.

Priority is claimed on Japanese Patent Application No. 2015-163985, filed on Aug. 21, 2015, the content of which is incorporated herein by reference.

BACKGROUND

In order to cope with a recent increase in communication traffic, a further increase in communication (transmission) capacity has been required. However, in optical communication systems using a single-mode fiber (SMF) which is used in optical communication of related art, a limitation on an increase in capacity is expected. As a technique for exceeding the limitation, research and development of space division multiplexing (SDM) have been actively performed. As optical fibers for realizing SDM, there are a few-mode fiber (FMF) having the achievement of an increase in capacity by propagating a plurality of modes into one core and loading a signal into each mode, and a multicore fiber (MCF) having the achievement of an increase in capacity by loading a signal into each of a plurality of cores (see Patent Documents 1 to 6 regarding the MCF).

In addition, an example of the MCF generally includes two types of uncoupled MCF in which respective cores transmit information independently of each other, and coupled multicore fiber (C-MCF) in which supermodes are formed by (modes of) the respective cores being coupled to each other, and information is transmitted to each supermode (see Non-Patent Documents 1 to 3 regarding the C-MCF). The C-MCF is one of fibers for mode division multiplexing (MDM) transmission.

Particularly, in a few-mode transmission, it is important to reduce differential mode group delay (DGD) in order to reduce a load of signal processing such as multiple-input and multiple-output (MIMO). In the C-MCF, an examination aiming at reducing the DGD by enhancing coupling between the supermodes has been performed (see Non-Patent Documents 2 and 3).

Particularly, in the C-MCF, it has been shown experimentally that the DGD in MIMO reception can be reduced by using coupling between modes due to random perturbation in a fiber. Therefore, the C-MCF has attracted considerable attention (see Non-Patent Document 3). In addition, Non-Patent Document 4 discloses an example in which, as in a report produced by the group of the inventors, holes are added around the center of a core in an identical type of 3-core C-MCF.

CITATION LIST

Patent Literatures

[Patent Document 1] PCT International Publication No. WO 2010/038861
[Patent Document 2] Japanese Unexamined Patent Application, First Publication No. 2011-150133
[Patent Document 3] Japanese Unexamined Patent Application, First Publication No. 2013-40078
[Patent Document 4] Japanese Unexamined Patent Application, First Publication No. 2013-41148
[Patent Document 5] PCT International Publication No. WO 2013/161825
[Patent Document 6] Japanese Patent No. 5117636

Non-Patent Literatures

[Non-Patent Document 1] C. Xia, et al., "Supermodes for optical transmission," Optics Express, Vol. 19, No. 17, pp. 16653-16664, 2011
[Non-Patent Document 2] R. Ryf, et al., "Impulse Response Analysis of Coupled-Core 3-Core Fibers", ECOC2012, Mo.1.F.4, 2012
[Non-Patent Document 3] R. Ryf, et al., "1705-km Transmission over Coupled-Core Fibre Supporting 6 Spatial Modes", ECOC2014, PD.3.2, 2014
[Non-Patent Document 4] A. Igari and Others, "Transmission Characteristics Analysis of Identical Type of 3-Core Coupling Type Fiber Based on vectorial Finite-Element Method and Field Coupling Theory", Technical Report of IEICE, vol. 114, no. 453, OPE2014-224, 2015

In the C-MCF, since the supermodes are strongly coupled to each other, that is, a difference ($\Delta n_{eff}$) between effective refractive indexes ($n_{eff}$) of the supermodes is small, it is possible to reduce the DGD (see Non-Patent Document 2). However, in order to reduce $\Delta n_{eff}$ in a C-MCF of related art, a distance between cores has to be increased to some extent. For example, in Non-Patent Document 3, an example is reported in which the distance between cores is set to 28 µm in a 6-core C-MCF. Since increasing the distance between cores leads to a decrease in the degree of spatial multiplexing, there is a need for a structure in which the distance between cores can be further reduced.

Additionally, it is assumed that a region including two or more cores capable of being mutually coupled to each other as in the C-MCF is formed in each of cores of an uncoupled MCF. In this case, in order to reduce crosstalk between cores of the uncoupled MCF, that is, increase the distance between cores of the uncoupled MCF, it is desirable to further reduce each distance between two or more cores capable of being coupled to each other.

SUMMARY

One or more embodiments of the invention provide a multicore fiber capable of reducing DGD even when a distance between cores is made smaller than in the related art, and an optical cable using the multicore fiber.

One or more embodiments of the invention provide a multicore fiber that includes: at least three or more cores which are capable of single-mode transmission; a common clad that covers a periphery of the at least three or more cores; and a low-refractive index portion having a refractive index lower than that of the clad. The multicore fiber includes a region having the at least three or more cores arranged annularly on a cross-section perpendicular to a longitudinal direction, and at least a portion of the low-refractive index portion is arranged inside a minimum inscribed circle of two cores adjacent to each other within the region.

According to one or more embodiments, the multicore fiber may be a coupled multicore fiber.

According to one or more embodiments, the multicore fiber may include two or more regions having the at least three or more cores arranged annularly therein, at least one of the region may include the low-refractive index portion, and the at least three or more cores may be coupled to each other within the region.

According to one or more embodiments, the low-refractive index portion may be a hole.

In addition, according to one or more embodiments, an optical cable is provided that includes the multicore fiber in at least a portion thereof.

According to one or more embodiments, since an effective refractive index difference ($\Delta n_{\it eff}$) between supermodes can be reduced, it is possible to suppress DGD even when distances between cores are reduced. In addition, it is possible to further reduce the DGD under conditions in which the distances between cores are the same as those of related art.

DETAILED DESCRIPTION

Hereinafter, embodiments of the present invention will be described with reference to the accompanying drawings.

Figure 1:
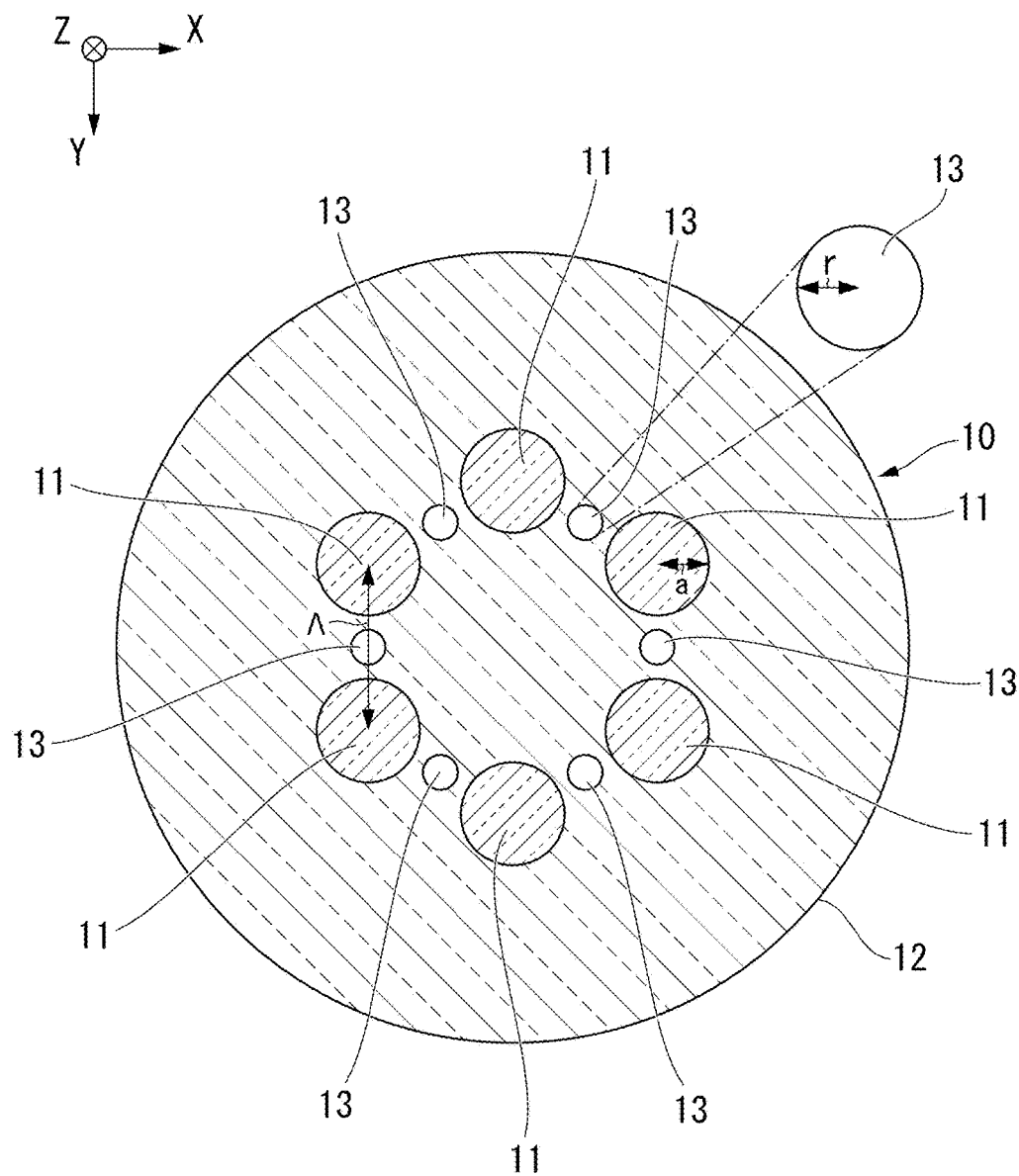
FIG. 1 is a cross-sectional view illustrating an example of a multicore fiber according to one or more embodiments of the present invention.

FIG. 1 is a cross-sectional view of a coupled multicore fiber (C-MCF: hereinafter, called a multicore fiber) 10 according to one or more embodiments. The multicore fiber 10 according to one or more embodiments is constituted by six cores 11, a clad 12, and six low-refractive index portions 13.

As shown in FIG. 1, the radius of the core 11 is set to a, the distance between cores (distance between centers of the core) is set to $\Lambda$, and the radius of the low-refractive index portion 13 is set to r. In addition, the refractive index of the core 11 is set to $n_{core}$, and the refractive index of the clad 12 is set to $n_{clad}$. The refractive index $n_{core}$ of the core 11 is larger than the refractive index $n_{clad}$ of the clad 12. In addition, in FIG. 1, the distance between the centers of the core 11 and the low-refractive index portion 13 is $\Lambda/2$.

In all the cores 11, single-mode transmission can be performed in a transmission band. The cores 11 are all constituted by an identical type of core. The effective refractive indexes of the cores 11 may be nearly equal to each other. The number of cores 11 is not limited to six, and, for example, three or more cores may be arranged.

The clad 12 is a common clad that covers the periphery of all the cores 11.

The low-refractive index portion 13 is constituted by a medium such as, for example, a hole which has a refractive index lower than that of the clad 12. The medium constituting the low-refractive index portion 13 may be solid, liquid, and gaseous. In a case where low-refractive index portion 13 is solid, the low-refractive index portion can be formed by inserting a rod-shaped member into the clad. In a case where the low-refractive index portion 13 is fluid (liquid or gaseous), the low-refractive index portion can be formed as a hole of the clad 12. Gas within the hole may be air, and the outer air of the MCF may be introduced into the hole. The inside of the hole may be vacuum.

Figure 2A:
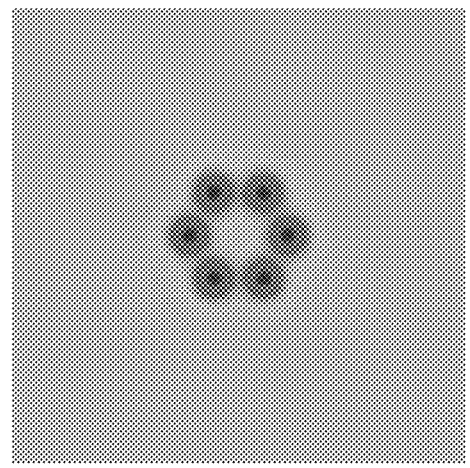
FIG. 2A is a schematic diagram (photograph in substitution for a drawing) illustrating a first supermode in the field distribution of a 6-core C-MCF according to one or more embodiments.
Figure 2B:
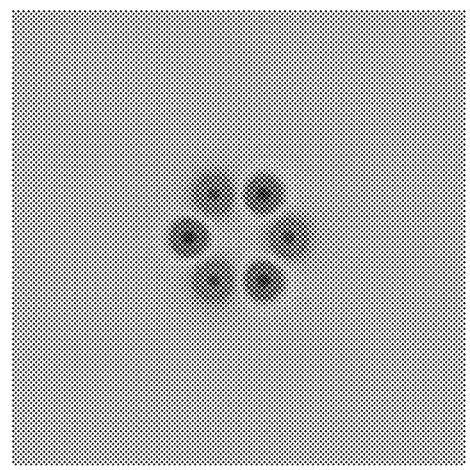
FIG. 2B is a schematic diagram (photograph in substitution for a drawing) illustrating a sixth supermode in the field distribution of the 6-core C-MCF according to one or more embodiments.

The cores 11 are arranged annularly on a cross-section perpendicular to the longitudinal direction of the multicore fiber 10. In one or more embodiments, the multicore fiber 10 is a 6-core C-MCF, and has six cores. FIGS. 2A and 2B illustrate the field distribution of the 6-core C-MCF. In the 6-core C-MCF, in a case where the respective cores operate in a single mode, six supermodes are present. Among the supermodes, FIG. 2A illustrates a first supermode (1st), and FIG. 2B illustrates a sixth supermode (6th). The electric fields of six cores have the same sign in the basic (first) supermode. On the other hand, nodes are formed in which the sign of an electric field (field) is reversed between the cores in the higher-order (second to sixth) supermode. In the sixth supermode, respective nodes are formed between two cores adjacent to each other. Among these nodes, the effective refractive index $n_{\it eff}$ of the basic supermode is highest, and $n_{\it eff}$ of the higher-order supermode is lower than $n_{\it eff}$ of the basic supermode.

The first supermode has an even-symmetric field distribution between cores adjacent to each other, whereas the sixth supermode has an odd-symmetric field distribution between cores adjacent to each other. That is, the sixth supermode is less in the localization of power than the first supermode, in a region between cores adjacent to each other. Consequently, when a low-refractive index portion is provided in a region in which the power of the first supermode is localized as compared with the power of the sixth supermode, $n_{\it eff}$ of the first supermode decreases more greatly than $n_{\it eff}$ of the sixth supermode. Thereby, the difference $\Delta n_{\it eff}$ of $n_{\it eff}$ between supermodes decreases, and thus it is possible to enhance coupling between supermodes. As a result, in a case where the same degree of DGD as that of a C-MCF not including a low-refractive index portion is attempted to be obtained, the distance between cores is made smaller, and thus it is possible to improve the degree of spatial multiplexing. In addition, in a case where the same degree of the distance between cores as that of the C-MCF not including a low-refractive index portion is provided, it is possible to further reduce the DGD. The DGD of a MCF may be, for example, equal to or less than 500 ps/km, and may be equal to or less than 200 ps/km.

Here, a relationship between the first supermode and the highest-order (sixth) supermode of the 6-core C-MCF will be described. The relationship between the first supermode and the highest-order (sixth) supermode of 3 or more-core MCF is same as the 6-core C-MCF. The number of cores included annularly may be an odd number (3, 5, 7, . . . ) equal to or greater than 3, and may be an even number (4, 6, 8, . . . ) equal to or greater than 4. In addition, even in higher-order supermodes (second to fifth supermodes in a case of 6 cores) rather than the highest-order supermode, points having an odd-symmetric field distribution between cores adjacent to each other are present, and thus an effect is obtained with respect to the second or higher-order supermodes.

At least a portion of the low-refractive index portion 13 may be arranged inside the minimum inscribed circle which contacts with adjacent two cores to each other among a plurality of cores arranged annularly. Here, the minimum inscribed circle refers to a circle in which a shortest distance between two regions (cores) is set to a diameter. In the case of FIG. 1, a radius of each inscribed circle is $(\Lambda/2)-a$. The low-refractive index portion 13 may include the center of the inscribed circle. The entire low-refractive index portion 13 may be arranged inside the inscribed circle. The center of the low-refractive index portion 13 may be coincident with the center of inscribed circle. The low-refractive index portion 13 may not be in contact with the core, and the clad may cover the periphery of the low-refractive index portion 13. The radius r of the low-refractive index portion 13 may be smaller than (Λ/2)–a which is the radius of the minimum inscribed circle of two cores adjacent to each other. In a case where distances Λ which is between cores are not constant with respect to all the cores (outer circumferences) arranged annularly, a inscribed circle having a different radius may be set for each of two cores adjacent to each other.

In the example shown in FIG. 1, a case is shown in which the MCF has one region (coupled core region) including a plurality of cores arranged annularly, but the present invention is not limited to this case. The respective cores may have an identical type or different types. The MCF may have two or more coupled core regions, and may have one or more coupled core region and one or more uncoupled cores. Here, the coupled core region refers to a region in which supermodes occurring between a plurality of cores included in the region can be used in transmission. In addition, the uncoupled core refers to a core, having a single core included therein, in which transmission modes are independent of each other between the core and other cores.

In a MCF including two or more coupled core regions, transmission modes are mutually independent of each other between coupled core regions (that is, the respective regions are not coupled to each other). In the MCF including two or more coupled core regions, a low-refractive index portion may be provided in one or more coupled core regions. Thereby, in the coupled core region having a low-refractive index portion provided therein, the distance between cores within the region can be reduced. As a result, the distance between a core in one region and a core in another region is increased, and thus it is possible to reduce crosstalk between the regions.

Hereinbefore, although the embodiments of the present invention have been described, the present invention is not limited to the above-described embodiments, and can be modified variously without departing from the scope of the embodiments of the present invention.

According to one or more embodiments, the MCF can be used as a portion or the entirety of an optical fiber which is used in an optical transmission line, an optical waveguide, an optical cable, or the like. The optical cable may include the MCF in at least a portion thereof.

An example of a medium constituting cores and a clad of the MCF includes silica-based glass (silica glass), multi-component glass, plastic, or the like. An example of the silica-based glass includes pure silica glass having no additives contained therein, and silica-based glass having additives contained therein. An example of the additives includes Ge, Al, P, B, F, Cl, and one type or two types of alkali metal or the like.

In the C-MCF, similarly to a case of the FMF, coupling between modes occurs due to various perturbations (microbend, twist or the like) in a transmission line, and thus it is considered that MIMO processing is required similarly to normal MDM transmission on the receiving side. In that case, it is possible to achieve a reduction in the load of signal processing of MIMO or the like by using the multicore fiber which is obtained by reducing the DGD.

A wavelength band which is used in transmission in the MCF is not particularly limited, and an example thereof includes a C band (1,530 to 1,565 nm), an L band (1,565 to 1,625 nm), or the like. In single-mode operation conditions in use wavelength band, single-mode operation conditions of v≤2.405 as a normalized frequency $v=2\pi a(n_{core}^2-n_{clad}^2)^{1/2}/\lambda$ may be satisfied. A relative refractive index difference $\Delta=(n_{core}^2-n_{clad}^2)/(2n_{core}^2)$ is equal to or greater than 0.05%, and the upper limit of the core radius in which v≤2.405 is establish in a C+L band is approximately 13 μm. The value of Δ in which v≤2.405 is established in each core radius can be automatically determined. λ is a wavelength, and 2π/λ is a wavenumber $k_0$.

In addition, in the value a or Δ having a relation of v≥2.405, a transmission loss in a higher-order mode equal to or greater than an $LP_{11}$ mode may be equal to or greater than $\alpha_{Loss}$. In this case, a relation of $\alpha_{Loss}$>0 dB/m is established, and an example of this value includes 0.1 dB/m, 0.5 dB/m, 1.0 dB/m, 2.0 dB/m, or the like. An example of the cable cutoff wavelength $\lambda_{cc}$ of a fiber includes 1,260 nm or less, 1,000 nm or less, or the like.

As shown in Reference Literature 1 (Okamoto, "Foundation of Optical Waveguide", Corona Publishing Co., Ltd.), in a case where a, Δ and Λ are fixed, the coupling constant of a fiber-type directional coupler is dependent on the normalized frequency v (the same is true of V). In a case where the wavelength is changed in the range of a C+L band, a change in the v value is a maximum of approximately 0.15, and the value of the coupling constant does not much change. In a case where the core diameter a and the relative refractive index difference Δ are fixed, the coupling constant of the fiber-type directional coupler decreases approximately exponentially with an increase in Λ/a.

From the above, it is considered to be close to a normal FMF in a case where Λ/a is excessively small, and to be close to an uncoupled MCF in a case where Λ/a is excessively large. An example of the lower limit of Λ/a includes 2.0, 2.2, 2.4, 2.6, 2.8, 3.0, or the like. In addition, an example of the upper limit of Λ/a includes 5.0, 5.2, 5.4, 5.6, 5.8, 6.0, or the like. An example of the value of Λ/a includes an appropriate value such as 3.2, 3.5, 4.0, 4.5, 4.8, or 5.0.

The shortest distance (Λ-2a) between cores adjacent to each other has a relation of Λ-2a≥0 μm, and an example thereof includes 0.1 μm, 0.3 μm, 0.5 μm, 0.7 μm, 1.0 μm, 2.0 μm, 5.0 μm, 10.0 μm, 15.0 μm, 17.0 μm, or the like.

The radius r of the low-refractive index medium (such as a hole) is not particularly limited, and has a relation of r>0 μm. An example of the lower limit of r includes 0.1 μm, 0.25 μm, 0.5 μm, 0.7 μm, 1.0 μm, 1.5 μm, 2.0 μm, 2.5 μm, 3.0 μm, or the like.

The shortest distance ((Λ/2)–a–r, for example, in a case where the center of the low-refractive index portion is located at the central point between cores adjacent to each other) between the core and the low-refractive index portion has a relation of r–a–$a_2$≥0 μm, and an example thereof includes 0.1 μm, 0.3 μm, 0.5 μm, 0.7 μm, 1.0 μm, 1.5 μm, 2.0 μm, 2.5 μm, 3.0 μm, or the like.

Example

Here, the transmission characteristics of a hole-addition 6-core coupled fiber for mode division multiplexing transmission are analyzed, and the supermode characteristics (effective refractive index and group delay) of the MCF are evaluated by full-vectorial finite-element scheme analysis (Reference Literature 2: K. Saitoh and M. Koshiba, "Full-vectorial imaginary-distance beam propagation method based on a finite element scheme: application to photonic crystal fibers", IEEE J. Quantum Electronics, vol. 38, no. 7, pp. 927-933, July 2002). By adding holes between cores adjacent to each other, an effective refractive index difference between supermodes is reduced and coupling between modes is enhanced. Thereby, even in a case where the distance between cores is reduced, it is possible to reduce the effective refractive index difference between supermodes, and simultaneously to reduce differential mode group delay.

Regarding an identical type of 6-core C-MCF not including a low-refractive index portion, and an identical type of 6-core C-MCF provided with a hole as the low-refractive index portion between cores adjacent to each other, as shown in FIG. 1, analyses are performed as follows. Here, the radius of the core 11 is set to a, the refractive index of the core 11 is set to $n_{core}$, and the refractive index of the clad 12 is set to $n_{clad}$. In the shown example, each core 11 is arranged on the peak of a regular hexagon of which the centroid is set to the center of a fiber.

The refractive indexes of the core and the clad are calculated by the Sellmeier equation, in consideration of wavelength dependency. In a case where holes are added, the radius of the holes is set to r, and the refractive index of the holes is set to 1.0. in a case where no hole is added, the radius r of the hole is set to 0 μm. In addition, the distance between the centers of cores is set to Λ.

In the disposition of a regular hexagon, the distance from the center of a fiber to the center of each core is also set to Λ. Further, the relative refractive index difference of the core with respect to the clad is set to $\Delta=(n_{core}^2-n_{clad}^2)/(2n_{core}^2)$. The value of the normalized frequency V is $V=k_0 a(n_{core}^2-n_{clad}^2)^{1/2}$. Here, $k_0$ is a free-space wavenumber.

In the present example, Λ is set to be equal to or less than 28 μm. This is a value which is the same as or smaller than the distance A=28 μm between cores of Non-Patent Document 3 (ECOC2014, PD.3.2) which is an identical type of 6-core C-MCF not including a low-refractive index portion in the center. As parameters of the 6-core C-MCF common to the respective analysis examples, a is set to 5.55 μm, Δ is set to 0.32 μm, the wavelength is set to 1,550 nm, and the clad diameter is set to 125 μm. In addition, as described above, the number of propagation modes in the 6-core C-MCF is six, and the propagation modes are called the first to sixth supermodes ($1^{st}$, $2^{nd}$, $3^{rd}$, $4^{th}$, $5^{th}$, and $6^{th}$, respectively, in FIGS. 2A to 4), respectively.

DGD between the first and $m^{th}$ supermodes of this fiber and $\Delta n_{eff}$ are defined as DGD=$\tau_{mth}-\tau_{1st}$ and $\Delta n_{eff}=n_{eff\_mth}-n_{eff\_1st}$, respectively. Here, $\tau_{1st}$ and $\tau_{mth}$ indicate group delay times of the first and $m^{th}$ modes, respectively, and $n_{eff\_1st}$ and $n_{eff\_mth}$ indicate effective refractive indexes of the first and $m^{th}$ modes, respectively.

Regarding the fiber, as shown in FIG. 1, holes are added between cores, and thus $\Delta n_{eff}$ is reduced even in a case where the distance Λ between cores is reduced. Therefore, it is shown that the coupling between modes is enhanced, and that the DGD can be reduced.

In the sixth supermode, an electric field is constantly set to 0 between cores due to its symmetry, as shown in FIG. 2B, regardless of the presence or absence of a hole. On the other hand, in the basic supermode, it can be understood from FIG. 2A that the electric field between cores has a large value. That is, when focused on two cores adjacent to each other, these cores are even-symmetric in the first supermode, and are odd-symmetric in the sixth supermode. Thus, with little influence on the sixth supermode by adding a hole between cores, it is possible to reduce $n_{eff}$ of the first supermode, and to reduce the effective refractive index difference $\Delta n_{eff}$ between the basic (first) supermode and the higher-order (sixth) supermode.

Figure 3:
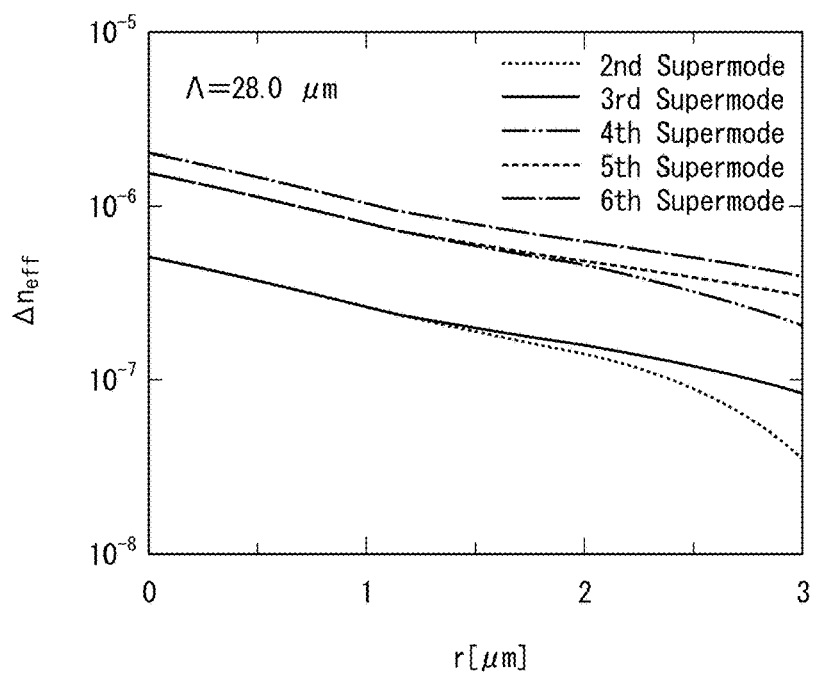
FIG. 3 is a graph illustrating an example of the hole radius dependency of $\Delta n_{\it eff}$ in a hole-addition 6-core C-MCF according to one or more embodiments.

FIG. 3 shows the hole radius dependency of $\Delta n_{eff}$ in the second to sixth supermodes of an identical type of 6-core C-MCF. In this case, the distance A between cores is 28.0 μm. From FIG. 3, it can be understood that it is possible to reduce each $\Delta n_{eff}$ between the first and higher-order (second to sixth) supermodes by enlarging the holes.

Figure 4:
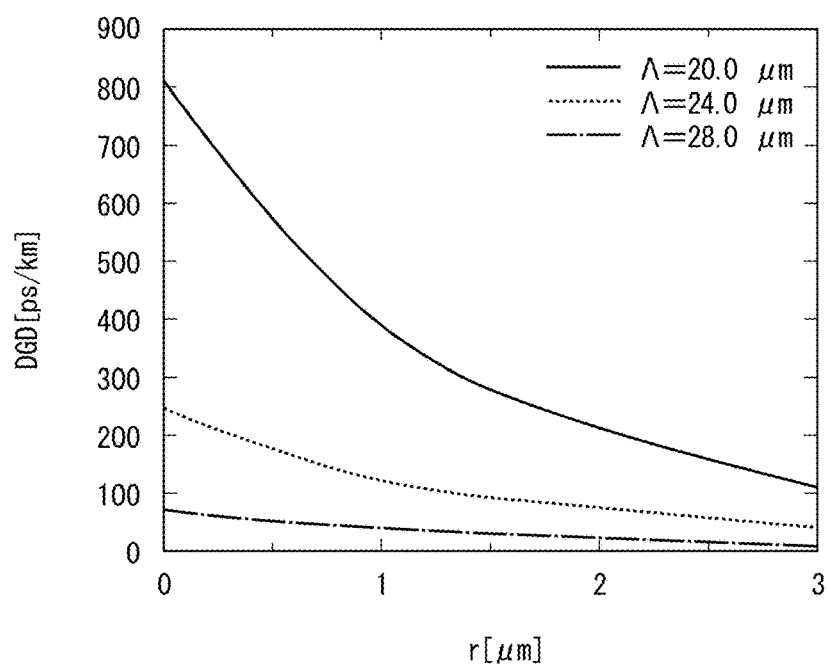
FIG. 4 is a graph illustrating an example of the hole radius dependency of DGD in the hole-addition 6-core C-MCF according to one or more embodiments.

In addition, FIG. 4 shows the hole radius dependency of the DGD between the first supermode and the sixth supermode in a case where A is 20 μm, 24 μm, or 28 μm. From FIG. 4, it can be understood that it is possible to reduce the DGD by increasing a hole.

From the above, it can be understood that a hole is added between the cores of the 6-core C-MCF, and thus it is possible to reduce the effective refractive index difference $\Delta n_{eff}$ between the supermodes, to enhance coupling between modes, and to reduce the differential mode group delay DGD.

REFERENCE SIGNS LIST

10: multicore fiber
11: core
12: clad
13: low-refractive index portion

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

The invention claimed is:
1. A multicore fiber comprising:
three or more cores that transmit in single-mode transmission;
a common clad that covers a periphery of the three or more cores; and
a low-refractive index portion that has a refractive index lower than a refractive index of the clad,
wherein
the multicore fiber includes two or more regions,
the three or more cores are arranged annularly in a cross-section perpendicular to a longitudinal direction,
each of the three or more cores is disposed in one of the two or more regions,
a plurality of cores of the three or more cores in a same region are coupled cores,
transmission modes are mutually independent of each other between the regions, and
at least a portion of the low-refractive index portion is arranged inside a minimum inscribed circle of two adjacent cores within the same region.
2. The multicore fiber according to claim 1, wherein the multicore fiber is a coupled type multicore fiber.
3. The multicore fiber according to claim 2, wherein the low-refractive index portion is a hole.
4. An optical cable comprising the multicore fiber according to claim 2 in at least a portion thereof.
5. An optical cable comprising the multicore fiber according to claim 3 in at least a portion thereof.
6. The multicore fiber according to claim 1, wherein the low-refractive index portion is a hole.
7. An optical cable comprising the multicore fiber according to claim 6 in at least a portion thereof.
8. An optical cable comprising the multicore fiber according to claim 1 in at least a portion thereof.
9. The multicore fiber according to claim 1, wherein the low-refractive index portion is a hole.

10. An optical cable comprising the multicore fiber according to claim 9 in at least a portion thereof.

11. An optical cable comprising the multicore fiber according to claim 1 in at least a portion thereof.

* * * * *